United States Patent
Shimizu et al.

(10) Patent No.: US 7,387,444 B2
(45) Date of Patent: Jun. 17, 2008

(54) OIL-IMPREGNATED SINTERED BEARING (75) Inventors: Seiji Shimizu, Aichi-ken (JP);
Tomokazu Sonozaki, Aichi-ken (JP)

(73) Assignee: NTN Corporation, Osaka (JP)

( * ) Notice: Subject to any disclaimer, the term of this patent is extended or adjusted under 35 U.S.C. 154(b) by 273 days.

(21) Appl. No.: 11/259,357

(22) Filed: Oct. 27, 2005

(65) Prior Publication Data
US 2006/0093247 A1 May 4, 2006

(30) Foreign Application Priority Data
Oct. 28, 2004 (JP) .............................. 2004-314607

(51) Int. Cl.
*F16C 33/00* (2006.01)
*F16C 23/04* (2006.01)
(52) U.S. Cl. ..................... 384/279; 384/192; 384/902
(58) Field of Classification Search ................ 384/279, 384/902, 192
See application file for complete search history.

(56) References Cited

U.S. PATENT DOCUMENTS 6,648,513 B2 * 11/2003 Okamoto et al. ........... 384/276
6,669,371 B2 * 12/2003 Tanaka et al. .............. 384/279
6,752,306 B2 * 6/2004 Okada ........................ 226/194
2007/0041672 A1 * 2/2007 Maruyama et al. ......... 384/279

FOREIGN PATENT DOCUMENTS

JP      11230160 A   *  8/1999
JP    2004308684 A   * 11/2004

* cited by examiner

*Primary Examiner*—Thomas R Hannon
(74) *Attorney, Agent, or Firm*—Arent Fox LLP (57) ABSTRACT

Disclosed is an oil-impregnated sintered bearing in which local relative sliding between the oil-impregnated sintered bearing and the shaft is avoided, thereby mitigating stress concentration on the bearing surface of the oil-impregnated sintered bearing. An oil-impregnated sintered bearing 1 which has in its inner periphery a bearing surface $1a$ making relative sliding with the outer peripheral surface $22a$ of a shaft 22 and which has at both axial ends of the bearing surface $1a$ crowning portions $1c$ which are of a configuration satisfying the following conditions: $1.75 \times 10^{-3} \leq \gamma/b1 \leq 5.2 \times 10^{-2}$, and $1.75 \times 10^{-3} \leq \gamma/b2 \leq 5.2 \times 10^{-2}$, and $0.2 \leq (b1+b2)/a \leq 0.8$, where $\gamma$ is the maximum radial drop amount of the crowning portions $1c$, $b1$ is the axial length of the crowning portion $1c$ at one axial end; $b2$ is the axial length of the crowning portion $1c$ at the other axial end; and a is the total axial length of the oil-impregnated sintered bearing 1.

4 Claims, 6 Drawing Sheets

OIL-IMPREGNATED SINTERED BEARING

BACKGROUND OF THE INVENTION

1. Field of the Invention

The present invention relates to an oil-impregnated sintered bearing obtained by impregnating a porous body formed of a sintered metal with a lubricant (lubricating oil or lubricating grease).

2. Description of the Related Art

In an oil-impregnated sintered bearing, a lubricating oil impregnated oozes out to the sliding portion (the portion of the bearing on which the shaft to be supported slides), and forms an oil film as a result of relative rotation between the bearing and the shaft. The shaft is supported by this oil film in a non-contact manner. As shown, for example, in FIG. 7, such an oil-impregnated sintered bearing is incorporated for use into a power transmission mechanism for a power window for opening and closing a window pane provided in a door panel of a vehicle (see, for example, JP2003-247548 A).

Figure 7:
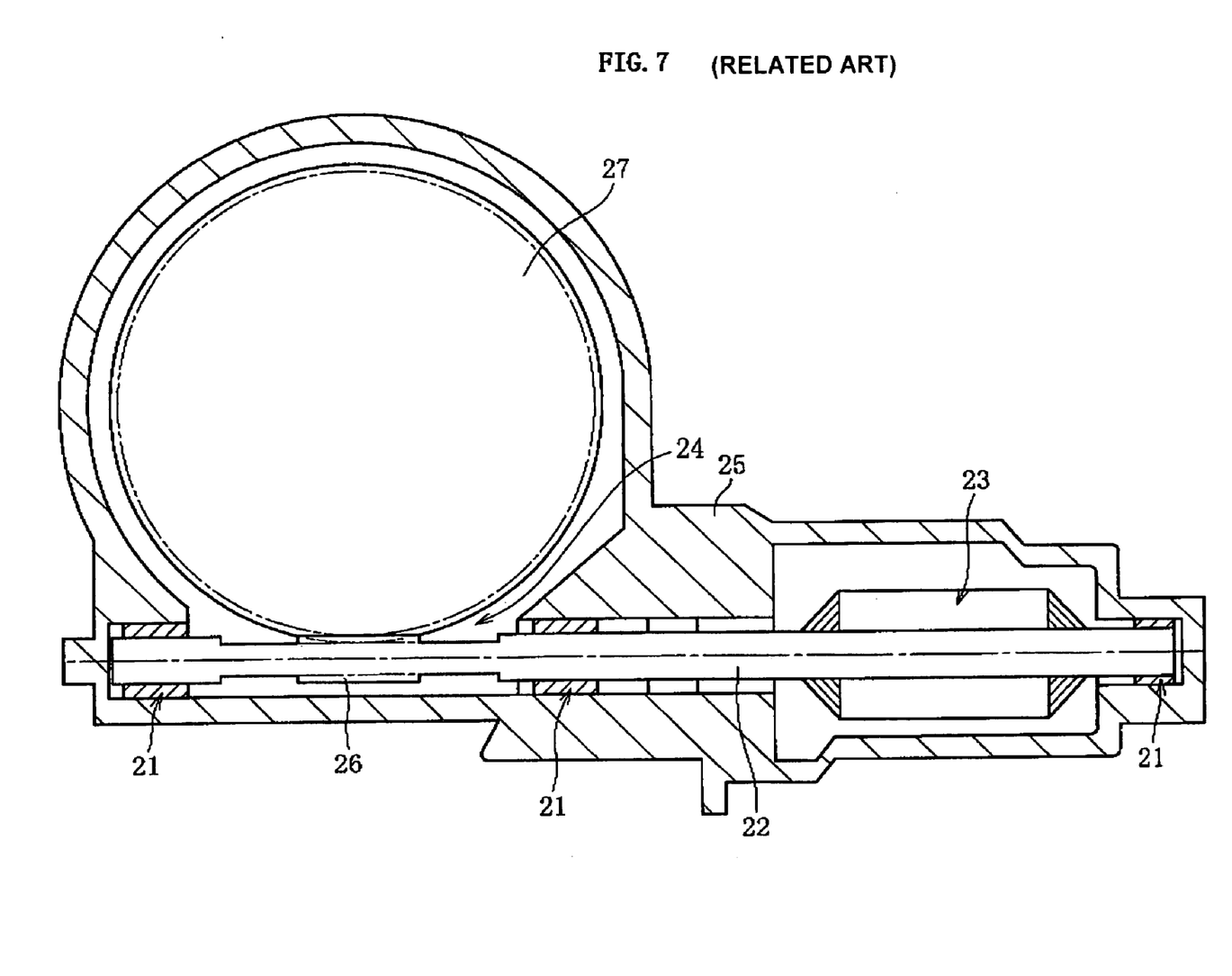
FIG. 7 is a sectional view of a power transmission mechanism for a power window into which an oil-impregnated sintered bearing is incorporated.

In the power transmission mechanism for a power window shown in FIG. 7, the torque of a motor 23 is reduced by a worm wheel mechanism 24, and the reduced torque is transmitted to a window pane opening/closing mechanism (not shown). In FIG. 7, a shaft 22 driven by the motor 23 is rotatably inserted into the inner periphery of one or a plurality of (three, in the example shown in the figure) oil-impregnated sintered bearings 21. The plurality of oil-impregnated sintered bearings 21 are fixed on predetermined coaxial positions in a casing 25. The worm wheel mechanism is composed of a worm gear portion 26 formed integrally with the shaft 22, and a wheel gear portion 27 which is in mesh with the worm gear portion 26 and is mechanically connected to a window pane opening/closing mechanism (not shown).

The torque input to the shaft 22 by the motor 23 is transmitted to the wheel gear portion 27 through the worm gear portion 26 of the shaft 22, and is further transmitted in a reduced state to the window pane opening/closing mechanism (not shown). As a result, the window pane, which is mechanically connected to the opening/closing mechanism, performs opening/closing motion in correspondence with the direction of the torque of the motor 23.

During operation of the above-mentioned power transmission mechanism for a power window, the lubricating oil which is impregnated in the oil-impregnated sintered bearings 21 oozes out to the sliding portions between the oil-impregnated sintered bearings 21 and the shaft 22, and oil films are formed by the lubricating oil thus oozing out. As a result, the shaft 22 is supported by the oil-impregnated sintered bearings 21 in a non-contact manner through the intermediation of the oil films, whereby a smooth sliding state is achieved between the components 21 and 22.

Generally speaking, in an oil-impregnated sintered bearing of this type, the inner diameter of the bearing surface provided in the inner periphery thereof is uniform over its entire axial dimension, and sliding (supporting) is effected between the shaft and the entire bearing surface.

Figure 8:
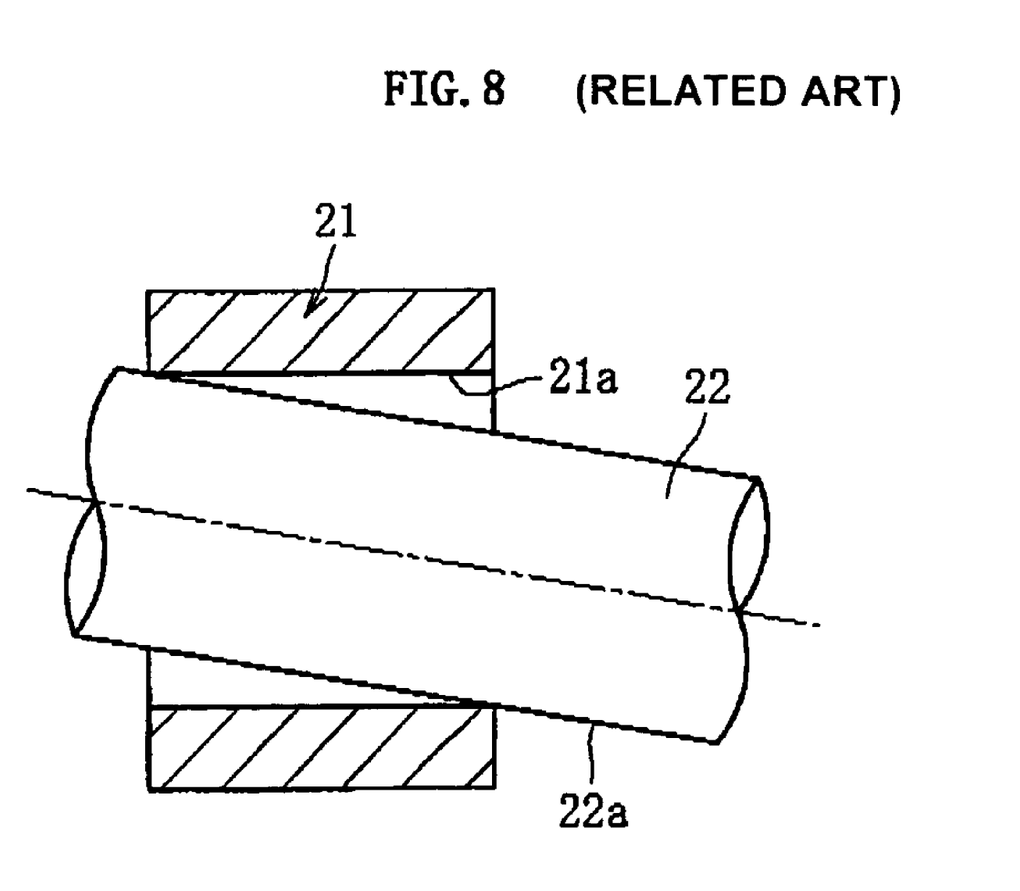
FIG. 8 is a sectional view of a conventional oil-impregnated sintered bearing.

However, in a certain type of power transmission mechanism, for example, in the power transmission mechanism shown in FIG. 7, the shaft 22 receives, due to the construction of the mechanism, a load from the wheel gear portion 27 through the worm gear portion 26, and is thereby deflected. Thus, as shown, for example, in FIG. 8, the outer peripheral surface (sliding surface) 22a of the shaft 22 may slide locally at an axial end of the bearing surface 21a of the oil-impregnated sintered bearing 21, and there is a fear of stress concentration being generated in the sliding region of the bearing surface 21a. Such stress concentration can lead to undesirable effects for the oil-impregnated sintered bearing, such as wear of the bearing surface of the oil-impregnated sintered bearing and generation of unusual noise.

JP 2003-120673 A discloses an oil-impregnated sintered bearing having tapered surfaces expanding its diameter in opposite directions at both axial ends of its inner periphery. These tapered surfaces are formed as clearance portions for allowing relative oscillatory displacement (run-out motion) between the shaft and the oil-impregnated sintered bearing, and their inclination angle is normally set between 10 and 45 degrees.

Thus, in the oil-impregnated sintered bearing as disclosed in JP 2003-120673 A, when relative wobbling motion occurs between the shaft and the oil-impregnated sintered bearing, the outer peripheral surface of the shaft slides locally on the border portions between the tapered regions and the non-tapered region of the inner peripheral surface of the oil-impregnated sintered bearing, or slides locally on the tapered regions. As a result, there is the possibility of the stress concentration on the inner peripheral surface of the oil-impregnated sintered bearing not being mitigated to a sufficient degree.

SUMMARY OF THE INVENTION

It is an object of the present invention to avoid local relative sliding between an oil-impregnated sintered bearing and a shaft, and to mitigate stress concentration on the bearing surface of the oil-impregnated sintered bearing.

To achieve the above object, there is provided, in accordance with an aspect of the present invention, an oil-impregnated sintered bearing which has in its inner periphery a bearing surface making relative sliding movement with the sliding surface of a shaft to be supported and which has at one axial end of the bearing surface a crowning portion, characterized in that the crowing portion has a configuration satisfying the following conditions: $1.75 \times 10^{-3} \leq \gamma/b \leq 5.2 \times 10^{-2}$, and $0.2 \leq b/A \leq 0.8$. Here, $\gamma$ is the maximum radial drop amount of the crowning portion; b is the axial length of the crowning portion; and A is the total axial length of the oil-impregnated sintered bearing. Of these, the radial drop amount means the radial distance from the axial generatrix of the non-crowning region of the bearing surface to the surface constituting the crowning portion.

Further, in order to attain the object described above, according to another aspect of the present invention, there is provided an oil-impregnated sintered bearing which has in its inner periphery a bearing surface making relative sliding movement with a sliding surface of a shaft to be supported and which has at both axial ends of the bearing surface a crowning portion, characterized in that the crowing portion has a configuration satisfying the following conditions: $1.75 \times 10^{-3} \leq \gamma/b1 \leq 5.2 \times 10^{-2}$, and $1.75 \times 10^{-3} \leq \gamma/b2 \leq 5.2 \times 10^{-2}$, and $0.2 \leq (b1+b2)/A \leq 0.8$. Here $\gamma$ is the maximum radial drop amount of the crowning portions; b1 is the axial length of the crowning portion at one axial end; b2 is the axial length of the crowning portion at the other axial end; and A is the total axial length of the oil-impregnated sintered bearing.

In this way, a crowning portion of the above-mentioned configuration is formed at one end or both ends of the bearing surface in the inner periphery of the oil-impregnated sintered bearing. Thus, even when there is a deviation between the axis of the oil-impregnated sintered bearing and the axis of the shaft due to deflection of the shaft or inclination thereof with respect to the oil-impregnated sintered bearing, the configuration of the bearing surface of the oil-impregnated sintered bearing is in conformity with the sliding surface of the shaft in which deflection or inclination has been generated, and the entire bearing surface or a wide region thereof makes relative sliding with the sliding surface of the shaft. As a result, the stress concentration on the bearing surface of an oil-impregnated sintered bearing is mitigated, and it is possible solve various problem, such as wear of the bearing surface and generation of unusual noise.

Further, as described above, the ratio of the maximum radial drop amount γ of the crowning portion with respect to the total axial length A of the oil-impregnated sintered bearing is made very small, whereby it is possible to pull out a core rod for the sizing of the inner periphery of the oil-impregnated sintered bearing without exerting any excessive force due to spring-back at the time of sizing. As a result, it is possible to simultaneously form the crowning portions at the axial ends by one sizing processing while maintaining high precision for the configuration of the crowning portions after the shaping.

The crowning portions may, for example, be also formed as tapered surfaces. In this case, it is desirable for the inclination angle of the tapered surfaces with respect to the axis to range from 0.1 to 3 degrees.

The above oil-impregnated sintered bearing device can be suitably incorporated for use into a power transmission mechanism for an automotive power window.

In this way, according to the present invention, local sliding between the oil-impregnated sintered bearing and the shaft can be avoided, making it possible to mitigate stress concentration on the bearing surface of the oil-impregnated sintered bearing. As a result, wear of the oil-impregnated sintered bearing and generation of unusual noise due to stress concentration can be suppressed, making it possible to use the oil-impregnated sintered bearing for a long period of time in a stable manner.

DESCRIPTION OF THE PREFERRED EMBODIMENTS

Embodiments of the present invention will now be described with reference to the drawings.

Figure 1:
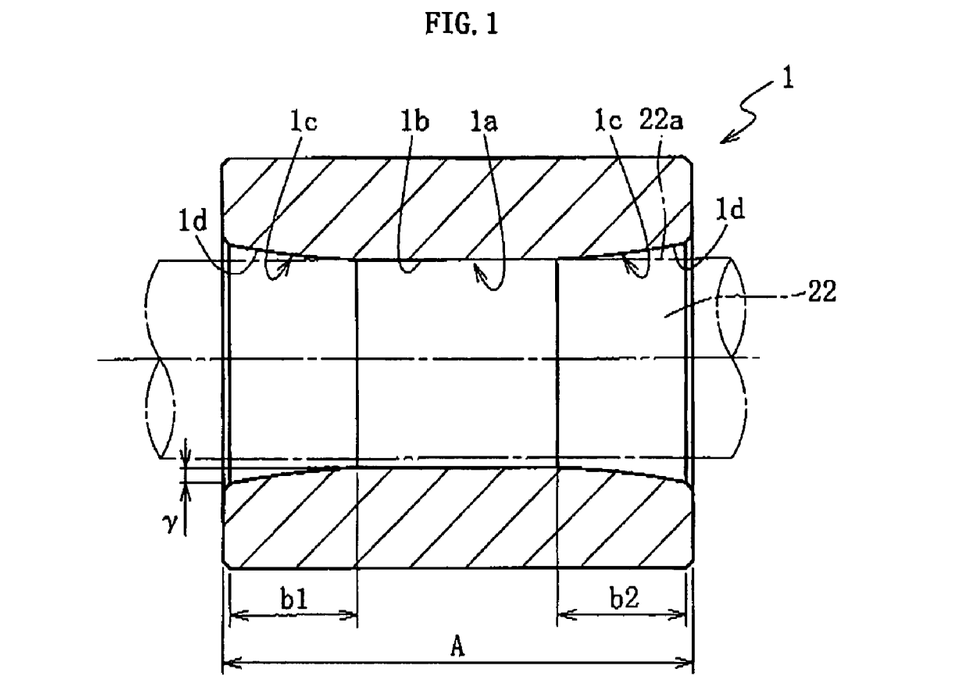
FIG. 1 is a sectional view of an oil-impregnated sintered bearing according to an embodiment of the present invention.

FIG. 1 is an example of an oil-impregnated sintered bearing according to an embodiment of the present invention. An oil-impregnated sintered bearing 1 is formed in a cylindrical configuration of a porous body consisting of a sintered metal. In the inner periphery of the oil-impregnated sintered bearing 1, there is formed a bearing surface 1$a$, which is composed of a central region parallel to the bearing axis, and crowning portions 1$c$ situated at the axial ends thereof. As the sintered metal, it is possible to use, for example, an Fe-type metal (including an alloy), or a Cu—Sn type alloy or a Cu—Fe—Sn type alloy. It is also possible to add graphite, molybdenum disulfide, etc. to such a metal material as the sliding material.

As shown in FIG. 1, the ratio of the axial length b1 of the crowning portion 1$c$ at one end to the maximum value γ of the radial drop amount of the crowning portion 1$c$ (In this embodiment, the chamfered portion formed at the axial end is not included in b1 or in γ), that is, b1/γ, is set within the range of the following formula:

$$1.75 \times 10^{-3} \leq b1/\gamma \leq 5.2 \times 10^{-2} \qquad \text{(Formula 1)}.$$

A similar setting is made on the axial length b2 of the crowning portion 1$c$ formed at the other end. In this embodiment, each crowning portion 1$c$ is formed by a rounded curved surface 1$d$, and the inclination angle of its tangent with respect to the axis of the oil-impregnated sintered bearing 1 increases smoothly. The sum total of the axial lengths b1 and b2 of the crowning portions 1$c$, i.e., b1+b2, is set with respect to the total axial length A of the bearing so as to be within the range of the following formula:

$$0.2 \leq (b1+b2)/A \leq 0.8 \qquad \text{(Formula 2)}.$$

The oil-impregnated sintered bearing 1 is incorporated for use into a power transmission mechanism for a power window as shown, for example, in FIG. 7, and the shaft 22 to be supported (e.g., indicated by alternated long and short dashed lines in FIG. 1) is inserted into the inner periphery of the oil-impregnated sintered bearing 1. In this case, the oil-impregnated sintered bearing 1 has at the axial ends of the bearing surface 1$a$ thereof, the crowning portions 1$c$ of a configuration as defined by the above formulas 1 and 2. As a result, even when deflection is generated in the shaft 22, the configuration of the bearing surface 1$a$ of the oil-impregnated sintered bearing 1 is in conformity with the outer peripheral surface (sliding surface) 22$a$ of the deflected shaft 22. As a result, the outer peripheral surface 22$a$ of the shaft 22 slides on the entire region of the bearing surface 1$a$ or a wide region thereof including the rounded curved surfaces 1$d$. As a result, stress concentration on the bearing surface 1$a$ of the oil-impregnated sintered bearing 1 is mitigated, and it is possible to attain a smooth sliding state between the components 1 and 22 while preventing wear of the oil-impregnated sintered bearing 1 and generation of unusual noise due to stress concentration.

In a durability test actually conducted by the present inventors, the wear amount of the oil-impregnated sintered bearing 1 after 500 hours of testing was 3 μm, and the wear amount of the oil-impregnated sintered bearing 1 after 3000 hours of testing was 5 μm. Thus, after either testing, no marked deterioration in the power transmission function of the power transmission mechanism for a power window was to be observed, thus proving the usefulness of the present invention.

The oil-impregnated sintered bearing 1 is produced, for example, by the following process.

Figure 3A:
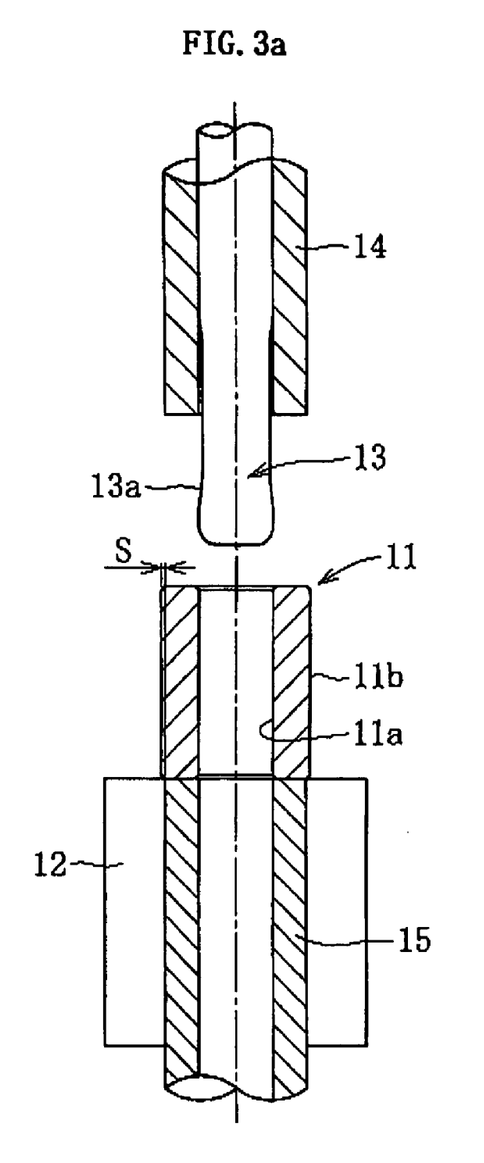
FIGS. 3A and 3B are conceptual sectional views illustrating a sintered bearing material sizing process.

FIG. 3A schematically shows a processing device used in the step (sizing step) of performing sizing on the oil-impregnated sintered bearing 1 before the formation of the crowning portions 1c on the bearing surface 1a (hereinafter referred to as a sintered bearing material 11). The processing device used in this embodiment is mainly composed of a cylindrical die 12 into which an outer peripheral surface 11b of the cylindrical sintered bearing material 11 is press-fitted, a core rod 13 for performing sizing on an inner peripheral surface 11a of the sintered bearing material 11, and a first punch 14 (upper punch) and a second punch 15 (lower punch) constraining the end surfaces of the sintered bearing material 11 from above and below (in the axial direction).

In the outer periphery of the core rod 13, there is provided a master form 13a (see FIG. 3A) having a configuration corresponding to the crowning portion 1c of the finished product. In this embodiment, the master form 13a exhibits a rounded curved surface expanding gradually and smoothly in opposite directions. Further, the expanding amount of the rounded curved surface portion of the master form 13a is approximately the same as the maximum radial drop amount γ of the crowning portion 1c to be shaped. Similarly, the width in the axial direction of the rounded curved surface portion of the master form 13a is set to be approximately the same as the axial length b1 (b2) of the crowning portion 1c to be shaped.

The upper punch 14 is fitted onto the outer periphery of the core rod 13 so as to be vertically (axially) slidable, and the upper punch 14 moves up and down integrally with the core rod 13. The upper punch 14 and the core rod 13 can be raised and lowered by a common drive source or independent, respective drive sources. In this embodiment, the lower punch 15 is raised and lowered by a driving means independent of or shared by the core rod 13 and the upper punch 14, and the die 12 is fixed to a stationary-side member (for example, a pedestal) of the device. Conversely, it is also possible to adopt a construction in which the die 12 is raised and lowered by the above driving means, and in which the lower punch 15 is fixed to the stationary-side member.

In the figure, the sintered bearing material 11 is formed by compacting a powder mainly consisting, for example, of the above metal, or an alloy obtained through an arbitrary combination of the above-mentioned materials, into the configuration as shown in the figure, and by burning it. At the stage prior to the sizing, the configuration of the sintered bearing material 11 is such that the region of its inner peripheral surface 11a corresponding to the bearing surface is straight over the total axial length.

[Initial State]

In the initial state shown in FIG. 3A, the die 12 is at a lower axial position with respect to the sintered bearing material 11, and the core rod 13 and the upper punch 14 are at upper axial positions with respect to the sintered bearing material 11. The lower punch 15 is slidably inserted into the shaping hole of the die 12, and the forward end of the lower punch 15 is at the same position as the upper end of the shaping hole of the die 12 or slightly protrudes from the upper end of the shaping hole of the die 12. The sintered bearing material 11 as a workpiece is arranged on the forward end surface of the lower punch 15. The radial sizing interference S of the sintered bearing material 11 is set, for example, within the range of 30 μm to 300 μm. Further, the maximum radial gap between the sintered bearing material 11 and the core rod 13 at the time of insertion of the core rod 13 is set somewhat smaller than the sizing interference S.

[Radial Pressing Process]

Figure 3B:
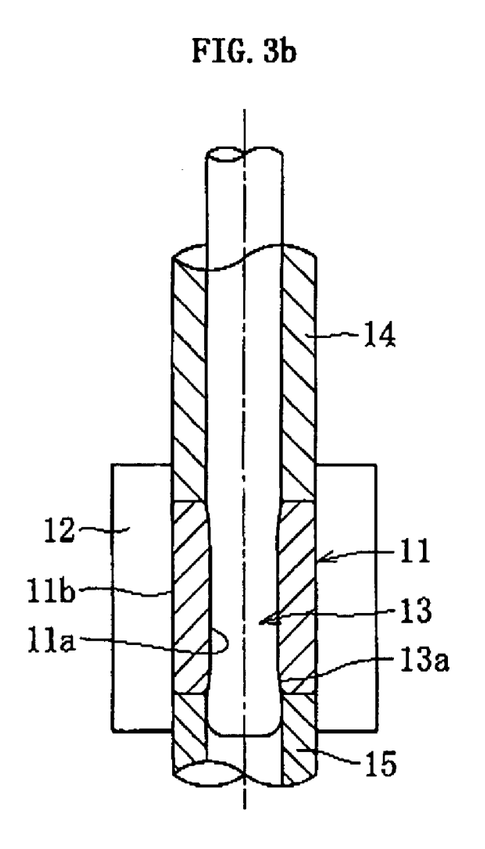

In the initial state described above, the core rod 13 and the upper punch 14 are lowered integrally; the core rod 13 is inserted into the inner periphery of the sintered bearing material 11, and at the same time, the upper punch 14 is pressed against the upper end surface of the sintered bearing material 11. As a result, the distance between the opposing end surfaces of the upper and lower punches 14 and 15 abutting the sintered bearing material 11 is set to a predetermined value. Further, while maintaining the axial opposing distance between the upper and lower punches 14 and 15, the core rod 13 and the upper and lower punches 14 and 15 are lowered integrally, whereby the sintered bearing material 11 is press-fitted into the shaping hole formed in the inner periphery of the die 12 as shown in FIG. 3B. As a result, the sintered bearing material 11 receives from the die 12 and the upper and lower punches 14 and 15 a pressing force corresponding to the sizing interference S, and undergoes deformation and radial sizing.

Along with the above operation, the inner peripheral surface 11a of the sintered bearing material 11 is pressed against the master form 13a of the core rod 13, and the region pressed against the maser form 13a becomes plastic deformation. As a result, the configuration of the master form 13a is transferred to the inner peripheral surface 11a of the sintered bearing material 11, and the crowning portions 1c at the axial ends are simultaneously formed. This embodiment employs a master form 13a with a rounded curved surface, so that the crowning portions 1c formed in the inner peripheral surface 11a of the sintered bearing material 11 exhibit a rounded configuration. It should be noted that between the crowning portions 1c formed by the above sizing and the axial end surfaces (which are chamfered surfaces in this embodiment) of the sintered bearing material 11, there may be generated burrs as a result of the plastic deformation of the inner peripheral surface 11a. However, by using the master form 13a with a rounded configuration, it is possible to crush the burrs outwardly (toward the chamfered surface side). Thus, it is possible to prevent burrs from entering the gap between the oil-impregnated sintered bearing 1 and the shaft 22 to thereby deteriorate the bearing performance.

[Releasing Process]

Figure 4A:
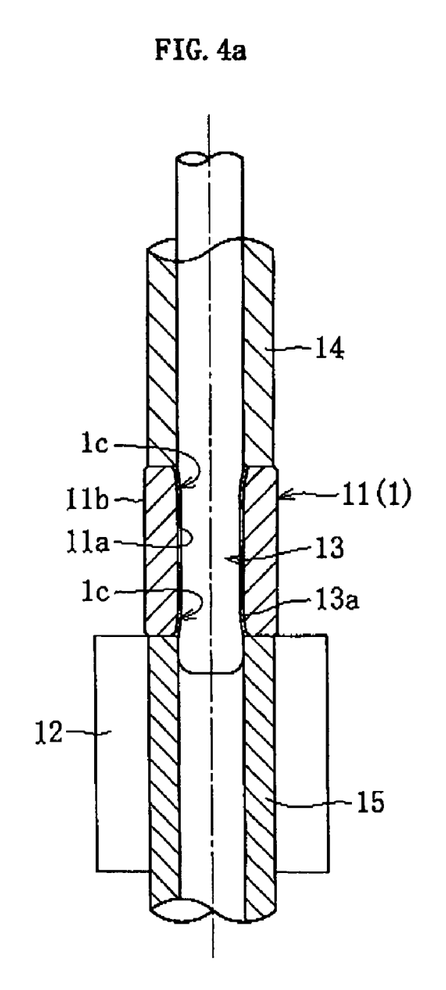
FIGS. 4A and 4B are conceptual sectional views illustrating a sintered bearing material sizing process.

After the completion of the radial pressing process, the core rod 13 and the upper and lower punches 14 and 15 are raised integrally, and the sintered bearing material 11 is pulled out of the die 12. As a result, the sintered bearing material 11 is released from the radial pressing force from the die 12, and, as shown in FIG. 4A, there occurs radial spring-back of the sintered bearing material 11. At this time, the radial spring-back amount is approximately the same as the expanding amount of the rounded curved surface portion of the master form 13a or larger than that, so that a state is attained in which the core rod 13 can be easily pulled out of the sintered bearing material 11.

Figure 4B:
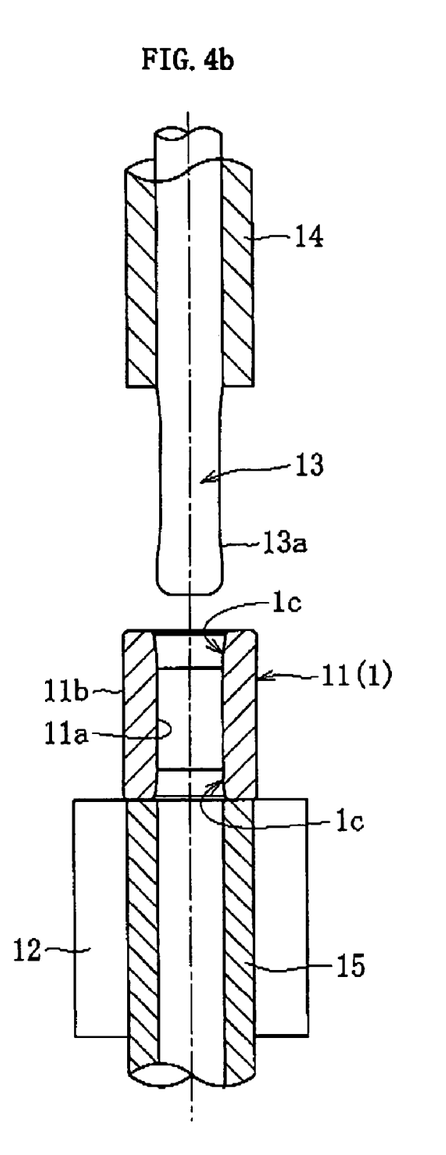

Next, as shown in FIG. 4B, the upper punch 14 and the core rod 13 are raised integrally to cancel the axial constraint of the sintered bearing material 11. At the same time, the upper punch 14 and the core rod 13 are raised to the position where the core rod 13 is pulled out of the sintered bearing material 11. As a result, the sintered bearing material 11 is released. Finally, the sintered bearing material 11 is impregnated with a lubricating oil, whereby the oil-impregnated sintered bearing 1 of the configuration as shown, for example, in FIG. 1 is completed. The density of the oil-impregnated sintered bearing 1 as the finished product is, for example, 5.5 to 7.5 [g/cm$^3$]. Its oil content is 5 to 25 [vol %], and the open area ratio of the bearing surface 1a is 5 to 50%.

It is also possible to separately perform rotary sizing on the inner peripheral surface 11a in order to adjust the surface open area ratio.

Thus, in the oil-impregnated sintered bearing 1 with the crowning portions 1c of the above-mentioned configuration, it is possible to form the crowning portions 1c at the axial ends simultaneously by one sizing process. Further, due to the spring-back when the radial pressing force is canceled, the core rod 13 can be easily pulled out of the sintered bearing material 11 without having to exert any excessive force. Due to this arrangement, the configuration of the crowning portions 1c formed is of high precision.

The present invention is not restricted to the embodiment described above.

Figure 2:
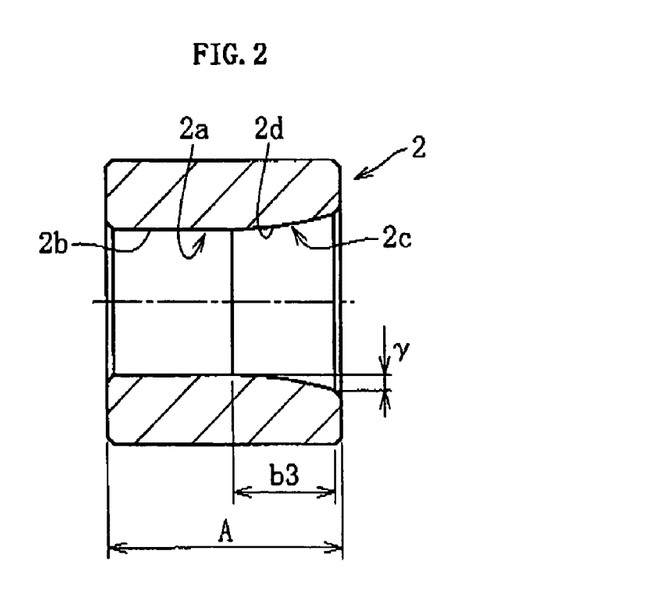
FIG. 2 is a sectional view of an oil-impregnated sintered bearing according to another embodiment of the present invention.

While in the oil-impregnated sintered bearing 1 of the above-described embodiment, there are formed in the bearing surface 1a of its inner periphery a central region 1b parallel to the axis, and crowning portions 1c situated at the axial ends of the central region 1b, it is also possible to adopt some other form. For example, it is also possible to form the crowning portion 1c solely at one end of the oil-impregnated sintered bearing 1. FIG. 2 shows an example in which a crowning portion 2c is formed by a rounded curved surface 2d. In this case, the crowning portion 2c is of a configuration satisfying formula 1. Further, with respect to the total axial length a of the oil-impregnated sintered bearing 2, its axial length b3 is set to be within the range of the following formula:

$$0.2 \leq b3/a \leq 0.8 \quad \text{(Formula 3)}.$$

Figure 5:
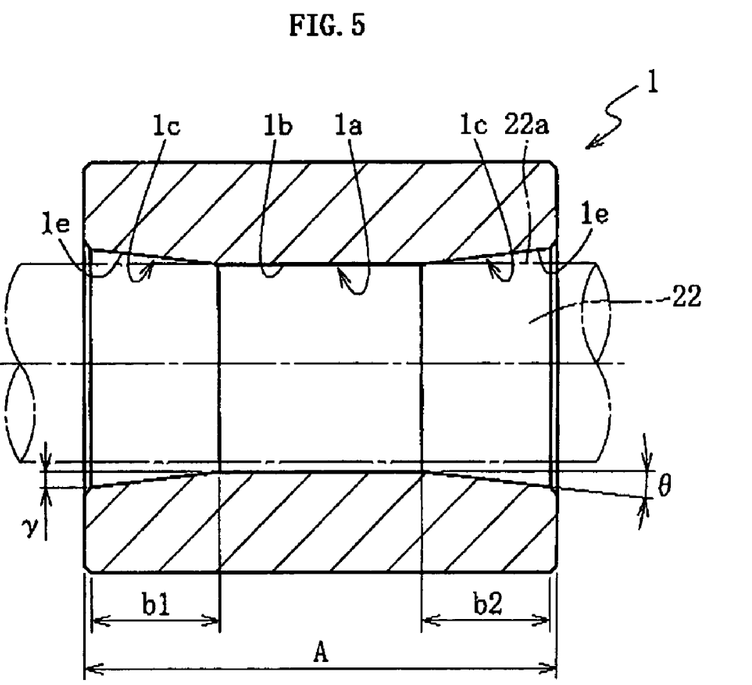
FIG. 5 is a sectional view of an oil-impregnated sintered bearing according to another embodiment of the present invention.
Figure 6:
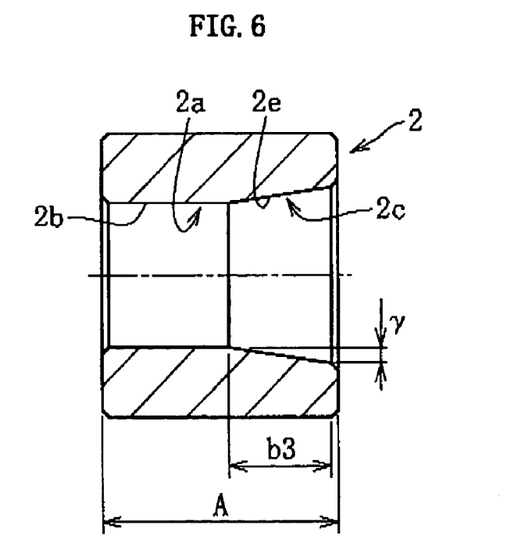
FIG. 6 is a sectional view of an oil-impregnated sintered bearing according to still another embodiment of the present invention.

While in the above examples the crowning portions 1c and 2c are formed by the rounded curved surfaces 1d and 2d, it is also possible, as shown, for example, in FIGS. 5 and 6, to form the crowning portions 1c and 2c by tapered surfaces 1e and 2e at a fixed inclination angle θ with respect to the axis. In this case, the inclination angle θ is set to be within the range of 0.1 to 3 degrees. It is also possible to connect the tapered surfaces 1e, 2e constituting the crowning portions 1c, 2c smoothly with the central region 1b, 2b through rounded curved surfaces.

The above-described oil-impregnated sintered bearing 1, 2 can be incorporated for use into the power transmission mechanism of a power window as described above. Apart from this, it can also be incorporated for use, for example, into the slide mechanism of the optical pick-up portion of an optical disk drive.

What is claimed is:

1. An oil-impregnated sintered bearing, comprising: a bearing surface provided in its inner periphery, the bearing surface making relative sliding movement with a sliding surface of a shaft to be supported; and a crowning portion provided at one axial end of the bearing surface, wherein the crowing portion has a configuration satisfying the following conditions: $1.75 \times 10^{-3} \leq \gamma/b \leq 5.2 \times 10^{-2}$, and $0.2 \leq b/A \leq 0.8$, where γ is a maximum radial drop amount of the crowning portion; b is an axial length of the crowning portion; and A is a total axial length of the oil-impregnated sintered bearing.

2. An oil-impregnated sintered bearing, comprising: a bearing surface provided in its inner periphery, the bearing surface making relative sliding movement with a sliding surface of a shaft to be supported; and crowning portions provided at both axial ends of the bearing surface, wherein the crowning portions each have a configuration satisfying the following conditions: $1.75 \times 10^{-3} \leq \gamma/b1 \leq 5.2 \times 10^{-2}$, and $1.75 \times 10^{-3} \leq \gamma/b2 \leq 5.2 \times 10^{-2}$, and $0.2 \leq (b1+b2)/A \leq 0.8$, where γ is a maximum radial drop amount of the crowning portions; b1 is an axial length of the crowning portion at one axial end; b2 is an axial length of the crowning portion at the other axial end; and A is a total axial length of the oil-impregnated sintered bearing.

3. An oil-impregnated sintered bearing as claimed in claim 1 or 2, wherein the crowning portion is formed by a tapered surface whose inclination angle ranges from 0.1 to 3 degrees.

4. An oil-impregnated sintered bearing as claimed in claim 3 and which is used in a power transmission mechanism for an automotive power window.

* * * * *